(12) United States Patent
Blesener et al.

(10) Patent No.: US 11,236,807 B2
(45) Date of Patent: Feb. 1, 2022

(54) ACTUATORS FOR USE WITH AN EXTERNAL CONTROLLER

(71) Applicant: Power Engineering & Mfg., Inc., Blaine, MN (US)

(72) Inventors: James Lawrence Blesener, Blaine, MN (US); Amir Hooshang Amighi, Blaine, MN (US)

(73) Assignee: Power Engineering & Mfg., Inc., Blaine, MN (US)

( * ) Notice: Subject to any disclaimer, the term of this patent is extended or adjusted under 35 U.S.C. 154(b) by 0 days.

(21) Appl. No.: 16/429,942

(22) Filed: Jun. 3, 2019

(65) Prior Publication Data
US 2020/0378482 A1     Dec. 3, 2020

(51) Int. Cl.
  *F16H 25/20*     (2006.01)
  *F16H 1/20*     (2006.01)
  (Continued)

(52) U.S. Cl.
  CPC .............. *F16H 25/20* (2013.01); *F16H 1/20* (2013.01); *G05B 19/416* (2013.01); *G08C 17/02* (2013.01);
  (Continued)

(58) Field of Classification Search
  CPC ........ H02K 7/06; H02K 11/215; H02K 7/116; H02K 5/08; H02K 7/108; H02K 11/35;
  (Continued)

(56) References Cited

U.S. PATENT DOCUMENTS

| 4,821,521 A | * | 4/1989 | Schuler | E05B 81/25 |
| | | | | 292/144 |
| 5,523,636 A | * | 6/1996 | Nelson | H02K 7/10 |
| | | | | 310/103 |

(Continued)

FOREIGN PATENT DOCUMENTS

| DE | 8621592 U1 * | 9/1986 |
| ES | 1234729 | 9/2019 |

(Continued)

OTHER PUBLICATIONS

Uhf transmitter and receiver—Google Search, Oct. 22, 2020 (Year: 2020).*

(Continued)

*Primary Examiner* — Vinh Luong
(74) *Attorney, Agent, or Firm* — Skinner and Associates; Joel D. Skinner, Jr.

(57) ABSTRACT

An actuator for use with an external controller, either alone or in a group including other actuators controlled from the same external controller. The actuator includes a housing for encasing internal components of the device; a motor assembly for creating motion, the motor assembly being disposed within the housing; and a drive assembly for driving a pushrod, the drive assembly being arranged within the housing and slidingly connected to the motor assembly. A remote control communication circuit is electrically connected to the motor. The remote control communication circuit includes a short range transmitter/receiver for paring the actuator to an external control device and a longer range transmitter/receiver for communicating operational control signals between the external control device and the actuator.

15 Claims, 20 Drawing Sheets

(51) Int. Cl.
*G08C 17/02* (2006.01)
*H02K 5/08* (2006.01)
*H02K 7/06* (2006.01)
*H02K 7/108* (2006.01)
*H02K 11/215* (2016.01)
*H02K 11/35* (2016.01)
*G05B 19/416* (2006.01)
*H02K 7/116* (2006.01)

(52) U.S. Cl.
CPC .............. *H02K 5/08* (2013.01); *H02K 7/06* (2013.01); *H02K 7/108* (2013.01); *H02K 7/116* (2013.01); *H02K 11/215* (2016.01); *H02K 11/35* (2016.01); *F16H 2025/2031* (2013.01); *F16H 2025/2062* (2013.01); *F16H 2025/2071* (2013.01); *F16H 2025/2081* (2013.01); *G05B 2219/37312* (2013.01)

(58) Field of Classification Search
CPC ............. G08C 17/02; F16H 2025/2071; F16H 2025/2081; F16H 2025/2031; F16H 2025/2062; F16H 25/20; F16H 1/20; G05B 2219/3731; G05B 19/416; Y10T 292/1082; Y10T 292/57; Y10T 70/5978; Y10T 70/60; Y10T 70/65
See application file for complete search history.

(56) References Cited

U.S. PATENT DOCUMENTS

| | | | | |
|---|---|---|---|---|
| 5,697,236 A | * | 12/1997 | Kleefeldt | E05B 77/48 292/201 |
| 6,279,361 B1 | * | 8/2001 | Baukholt | E05B 81/14 292/201 |
| 8,915,515 B1 | | 12/2014 | Riibe | |
| 9,199,577 B1 | | 12/2015 | Messina et al. | |
| 2005/0081582 A1 | * | 4/2005 | Isaacs | E05B 47/0688 70/257 |
| 2010/0031714 A1 | * | 2/2010 | Brown | G07C 9/00896 70/91 |
| 2011/0092156 A1 | * | 4/2011 | Dreifus | H04B 1/034 455/41.2 |
| 2017/0013556 A1 | * | 1/2017 | Tanaka | H04W 16/14 |
| 2017/0265584 A1 | * | 9/2017 | Walker | G01D 5/24 |
| 2018/0223583 A1 | * | 8/2018 | Podkopayev | F16D 3/207 |
| 2020/0185965 A1 | * | 6/2020 | Poirier | H02J 50/27 |
| 2021/0091825 A1 | * | 3/2021 | Bergman | G08B 13/2431 |

FOREIGN PATENT DOCUMENTS

| | | | | |
|---|---|---|---|---|
| GB | 2465872 | | 9/2010 | |
| GB | 2585491 A | * | 1/2021 | ............... F16H 1/20 |
| GB | 2585491 A | | 1/2021 | |
| KR | 20200025649 | | 8/2018 | |

OTHER PUBLICATIONS

Temboo "5 Reasons to Use Sub-GHz for IoT Applications" Jan. 26, 2018 (Year: 2018).*
Define environmental elements Google Search, Apr. 19, 2021 (Year: 2021).*
Environmental factor, Wikipedia, Apr. 19, 2021 (Year: 2021).*
Environmental elements definition, environmental elements meaning, English Collins dictionary, Apr. 19, 2021 (Year: 2021).*
Define GHz transmitter, Google Search, Apr. 19, 2021 (Year: 2021).*
Define sub-GHz transmitter, Google Search, Apr. 19, 2021 (Year: 2021).*
EPO Machine Translation of ES1234729 (U), Solans, Sep. 16, 2019 (Year: 2019).*
EPO Machine Translation of KR20200025649 (A), Shik, Oct. 3, 2010 (Year: 2020).*

* cited by examiner

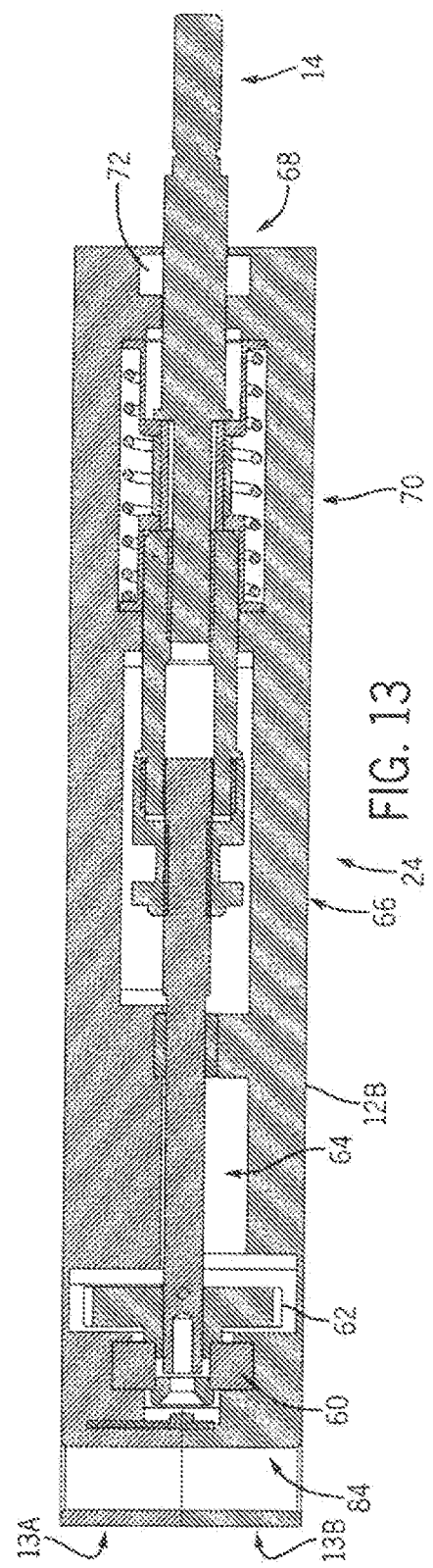

ACTUATORS FOR USE WITH AN EXTERNAL CONTROLLER

35 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND

1. Field of the Invention

The present invention relates, generally, to electro-mechanical technology. More particularly, the invention relates to electro-mechanical actuator systems, apparatus, and methods. Most particularly, the invention relates to electronic, remote controllable actuators and remote controller therefore. The apparatus, methods and systems of the invention permit control of multiple actuators from one hand held controller, and facilitate fast and easy to addition of actuators to the group.

2. Background Information about the Prior Art

Existing technology, in general, includes apparatus and/or methods for actuation. An actuator is a device or mechanism by which a control system acts upon an environment. Actuators require a source of energy and a control signal. The control signal is relatively low energy and may be electric voltage or current, pneumatic or hydraulic pressure, or even human power. The energy source may be an electric current, hydraulic fluid pressure, or pneumatic pressure. When an actuator receives a control signal, it responds by converting the signal's energy into mechanical motion. The control system can be simple (a fixed mechanical or electronic system), software-based (e.g. a printer driver, robot control system, or the like), a human, or any other input.

It is common to control an actuator by remote control, typically a hand held remote control or controller (also called a "hand held" herein.). It is also common to control multiple actuators with one controller. Typically, these controller installations include a housing with one radio frequency (RF) transmitter and multiple outputs to control multiple actuators. A shortcoming of this arrangement is that if the need arises to control a second or further actuator, a new RF transmitter must be added to the housing. And in some circumstances an entirely new hand held controller is necessary. Adding control of further actuators is burdensome.

This technology is believed to have significant limitations and shortcomings. For these and other reasons, a need exists for the present invention.

All US patents and patent applications, and all other published documents mentioned anywhere in this application are hereby incorporated by reference in their entirety.

BRIEF SUMMARY

The present invention provides an actuator apparatus and method which are practical, reliable, accurate, and efficient, and which are believed to fulfill a need and to constitute an improvement over the background technology.

In contrast to the one hand held box (controller and housing) with one RF module dedicated to control one or more actuators, the present invention involves constructing each actuator with its own unique RF control system and controller pairing protocol. This allows one standard hand held controller with multiple control buttons to control one or more actuators, and to make pairing of controller to actuator easy and reliable. If control of a second or further actuator is needed or desired, a large update is not needed. The user simply adds the actuator, pairs the new actuator to the hand held controller and the system is ready to use.

Another aspect of the invention involves pairing accuracy. Communication between hand held controller and actuator normally takes place via sub Ghz. RF. Sub Ghz RF permits longer range communication. However, if a hand held controller is addressed to an actuator using such sub Ghz RF transmission, the possibility exists of pairing of the controller with an intended actuator that is located a long distance away, for example approximately 50 feet or more away, and not the actuator (typically closer to the user) that the user intended to pair with. The present invention therefore adds Ghz RF transmission means, which is used during pairing so that the user can limit and control can better limit the distance locally for pairing accuracy.

A further aspect of the invention involves increase reliability and safety of operation. In many work environments in which remote controllable actuators are used, the use of microprocessors with firmware is considered a high risk. A single point processor failure can cause unintended motion and possibly an unintended and unsafe operation. The present invention therefore utilizes a second processor in a specific mode of operation to oversee and enable operation. Thus two (2) processor failures would be required to permit an unintended operation.

In one aspect, the invention provides a remotely controllable linear actuator which includes:

an electric motor for creating rotary motion;

a transmission connected to the motor, the transmission comprising a plurality of gears, a linear drive assembly connected to the transmission, the linear drive assembly comprising a rotary to linear converter communicatively connected to at least one transmission gear, and a linear output shaft connected to the rotary to linear converter, the linear output shaft being adapted to be connected to an external element; and a remote control communication circuit communicatively connected to the motor, the remote control communication circuit comprising a short range transmitter/receiver for paring the actuator to an external control device and a longer range transmitter/receiver for communicating operational control signals between the external control device and the actuator.

In another aspect, the linear actuator further includes:

a first processor communicatively connected to the remote control communication circuit, the primary processor: (a) receives motor control commands from the external controller; and (b) controls the speed and direction of the motor based on the motor control commands; and a second processor which is communicatively connected to the primary processor and to the remote control circuit, the second processor (a) receives motor control commands from the first processor, (b) receives motor control commands from the remote control communication circuit, and (c) enables control of the speed and direction of the motor, if the motor control commands received from the first processor match the motor control commands received from the remote control communication circuit.

In a still further aspect, the linear actuator further includes:

a spring centering mechanism, the spring centering mechanism placing the output shaft to center neutral position when power in the absence of power being applied to the linear actuator; and the first processor has an output which terminates power consumption after a predetermined time period.

The aspects, features, advantages, benefits and objects of the invention will become clear to those skilled in the art by reference to the following description, claims and drawings.

BRIEF DESCRIPTION OF THE SEVERAL VIEWS OF THE DRAWING

The present invention, and the manner and process of making and using it, will be better understood by those skilled in the art by reference to the following drawings.

FIG. 13 is a longitudinal cross-sectional view of the actuator taken at line 13-13 of FIG. 12.

DETAILED DESCRIPTION

FIGS. 1-5 show the exterior of an embodiment of an actuator 10 of the invention. The actuator 10 is compact, efficient, accurate, and reliable. The actuator 10 has a substantially rectilinear housing 12 that protects and serves as a base for various internal mechanical and electrical components. At one end, a mechanical output rod 14 exits the housing 12 at an aperture there though. The output rod 14 is connectible to a variety of external elements such as engine throttles, HVAC devices, mechanical lifts and the like. A port 16 is shown disposed at the same end as the output rod 14, and provides power to the actuator 10 and in some embodiments may provide control connections. Although the rod 14 is shown to have a curvilinear configuration, it is within the purview of the invention that it may have a rectilinear or other configuration or geometry. Similarly, the power and control port 16 may have various other configurations.

Figure 1:
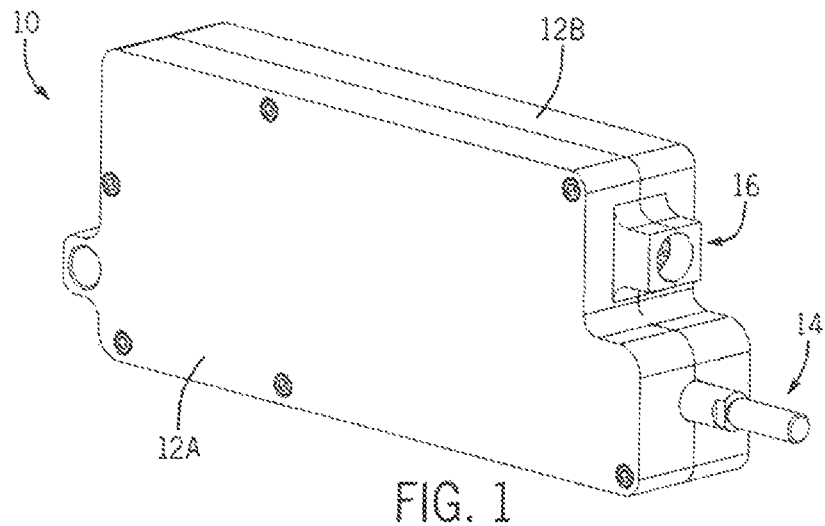
FIG. 1 is a perspective view of an embodiment of an actuator of the invention.
Figure 2:
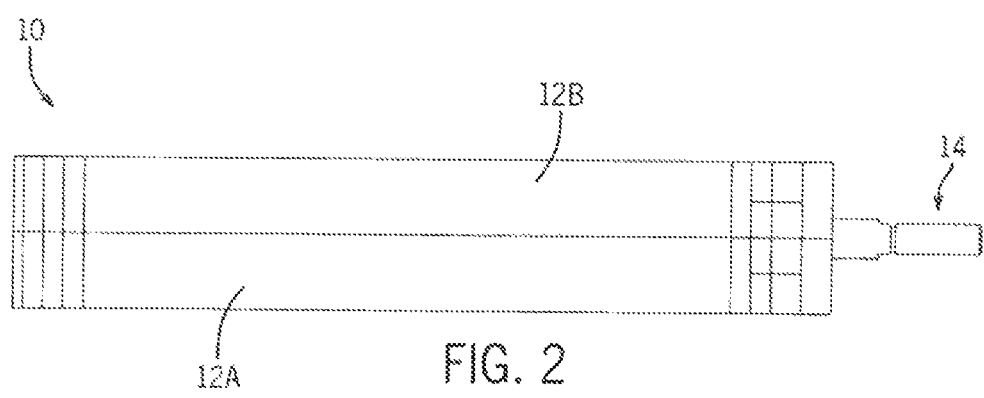
FIG. 2 is a top view, relative to FIG. 1, of the actuator.
Figure 3:
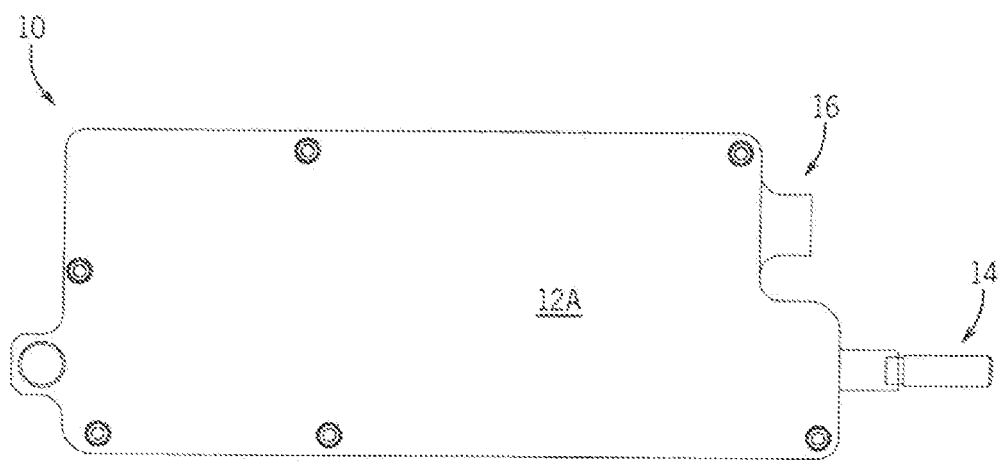
FIG. 3 is a side elevation view, again relative to FIG. 1, of the actuator. The opposite side view is substantially a mirror image of this view.
Figure 4:
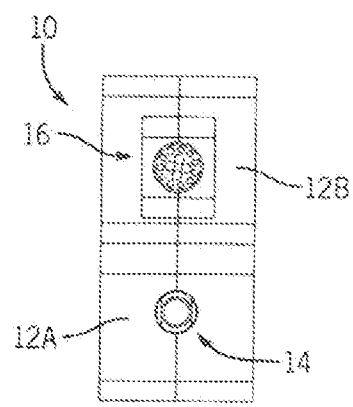
FIG. 4 is a front or distal end view of the actuator.
Figure 5:
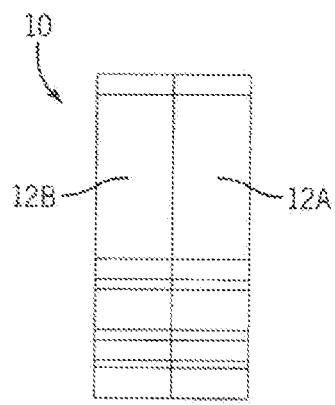
FIG. 5 is a back or proximal end view of the actuator.
Figure 6:
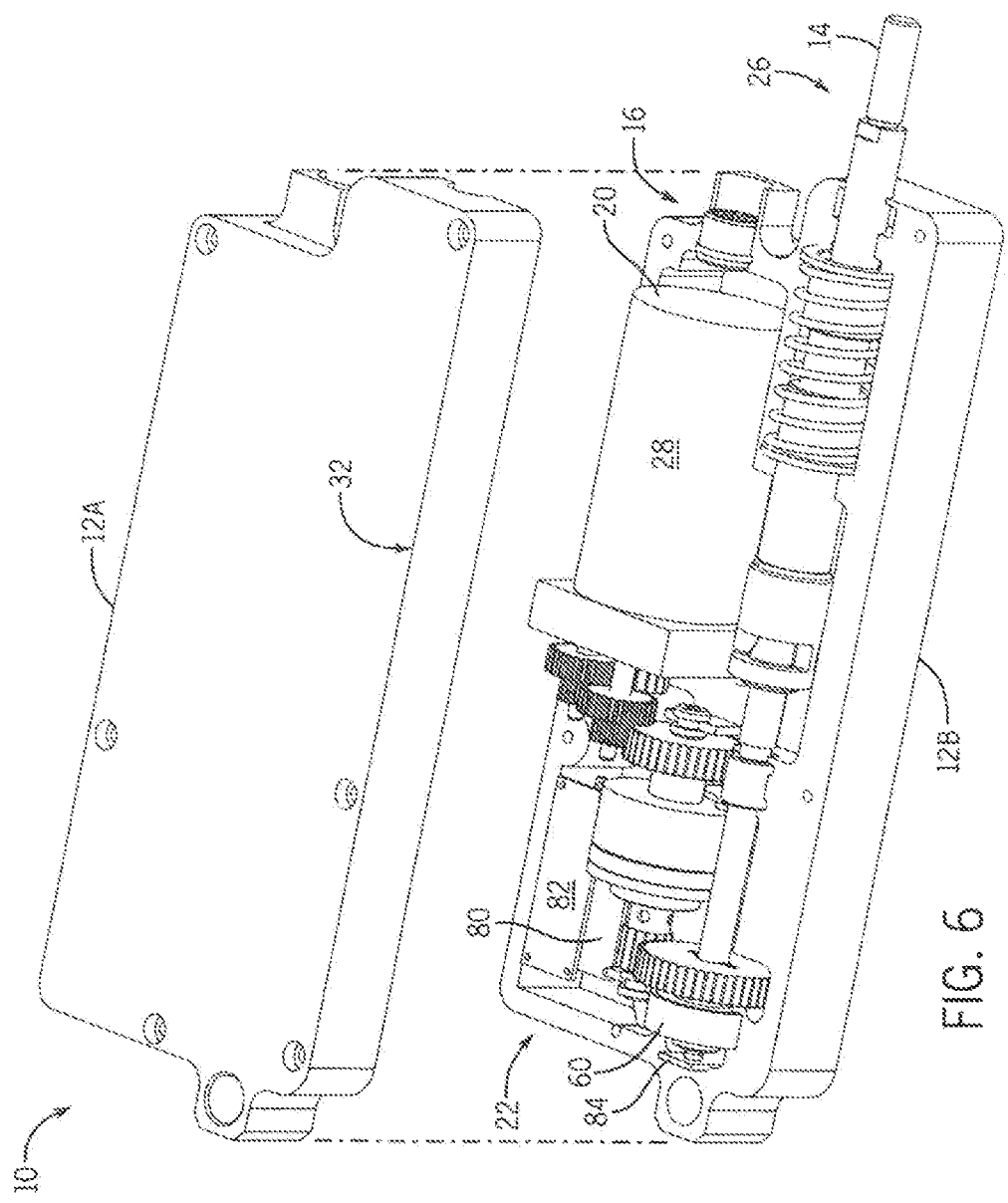
FIG. 6 is a perspective view of the actuator with its housing parts separated to reveal interior components thereof.
Figure 7:
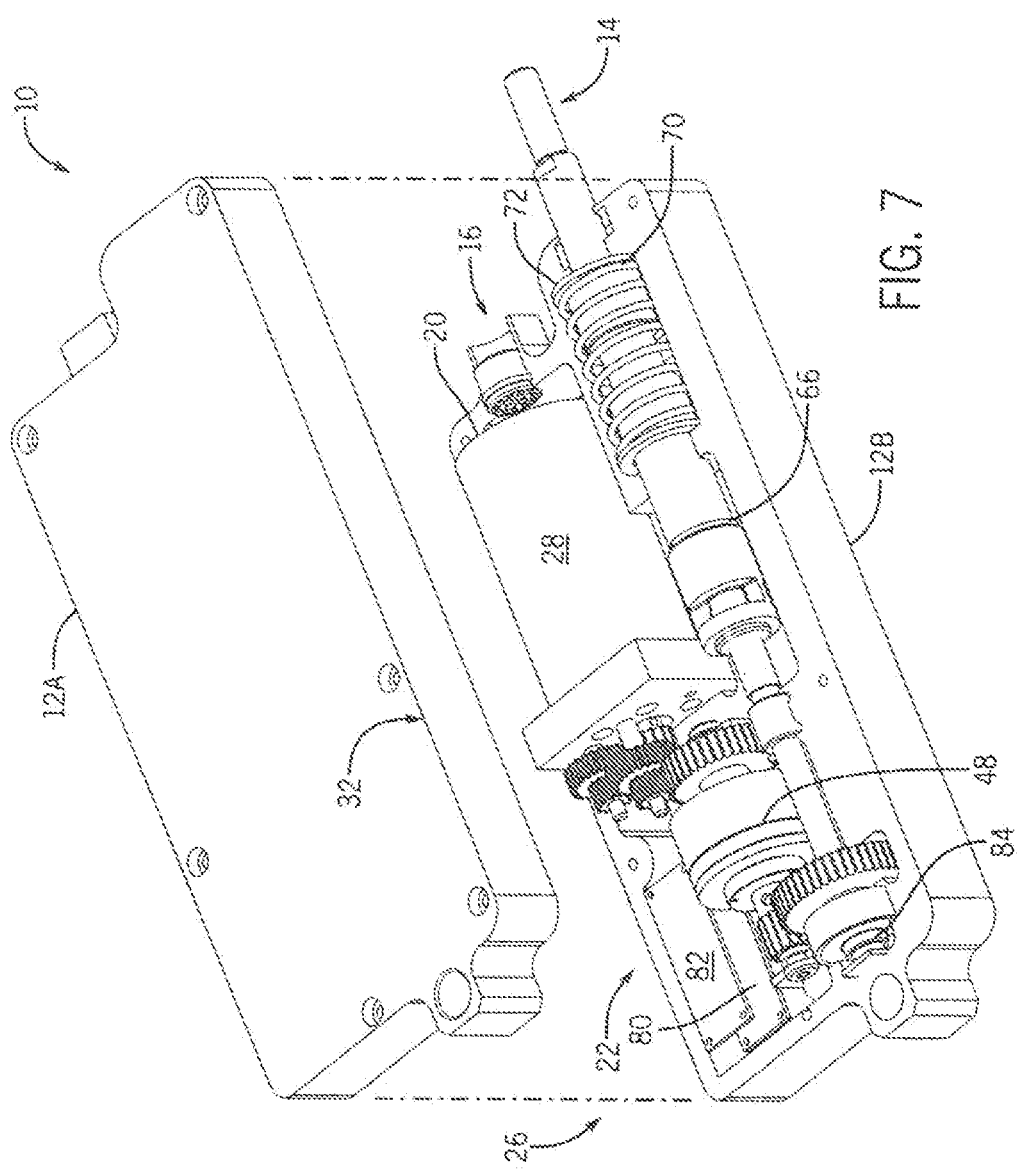
FIG. 7 is a further perspective view of the actuator with the housing parts separated to reveal a slightly different view of the interior components.
Figure 8:
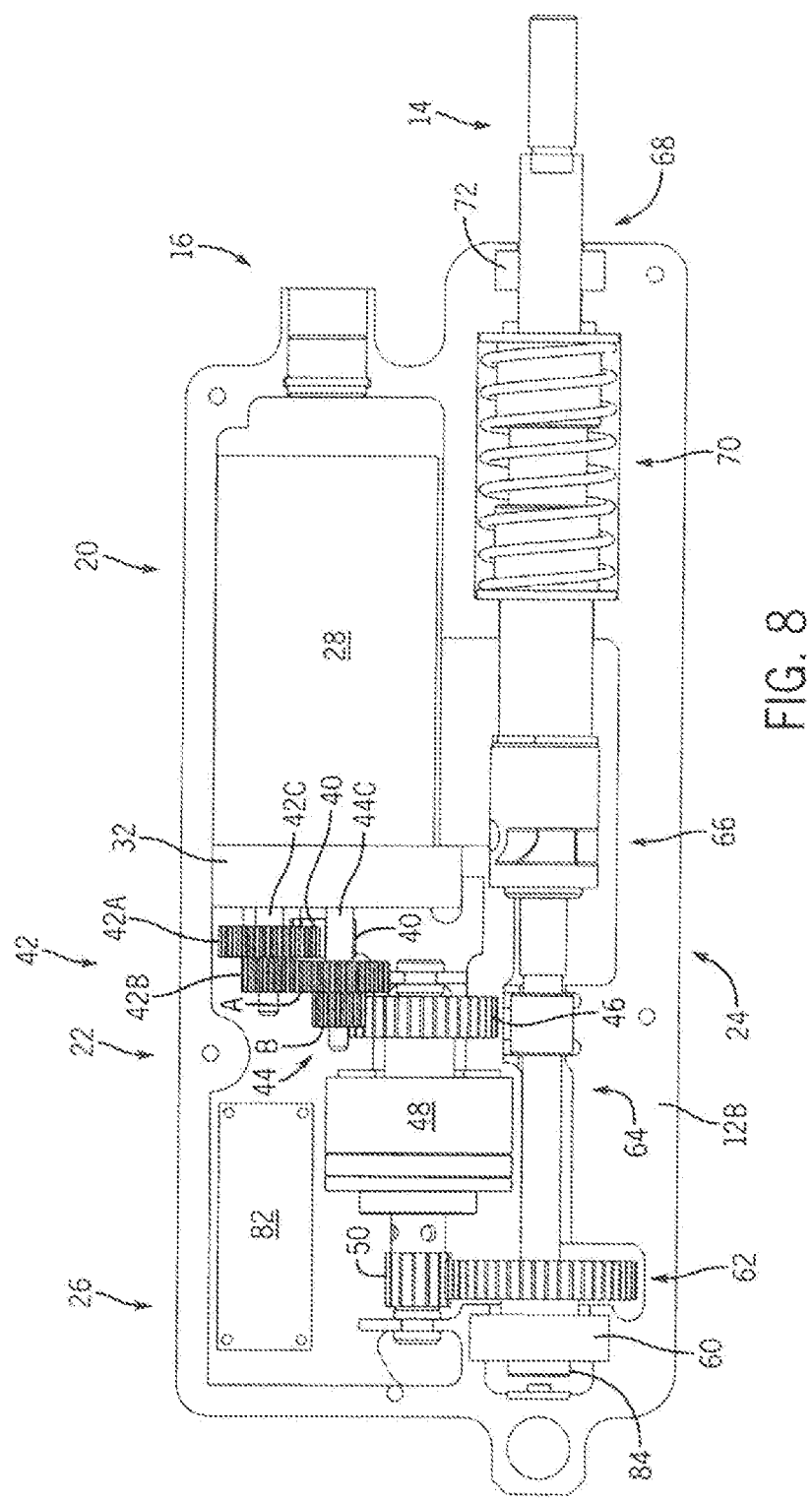
FIG. 8 is a side elevation view of the actuator with one of one housing part removed, showing internal components of the actuator.
Figure 9:
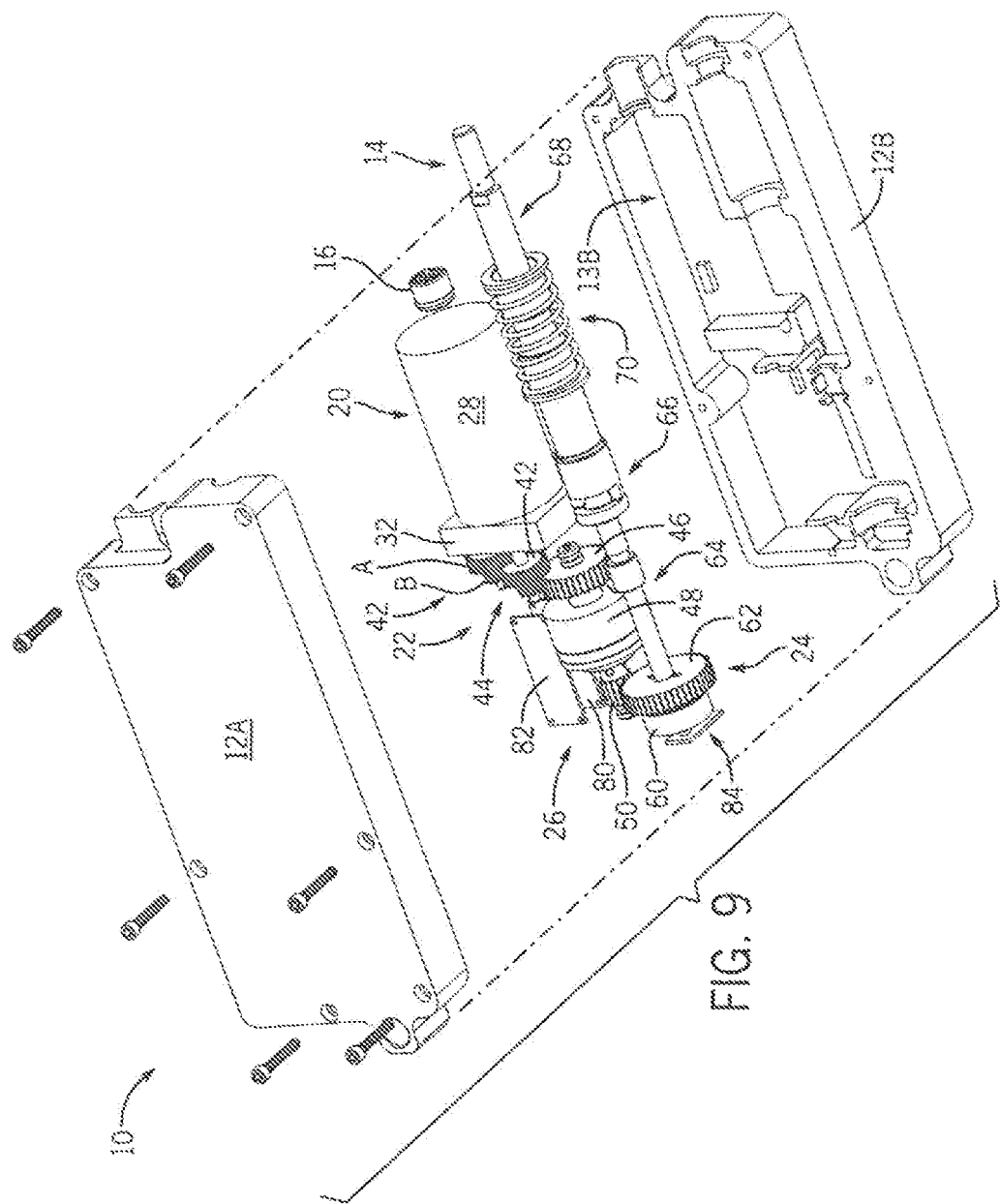
FIG. 9 is a partially exploded view of the actuator.
Figure 10:
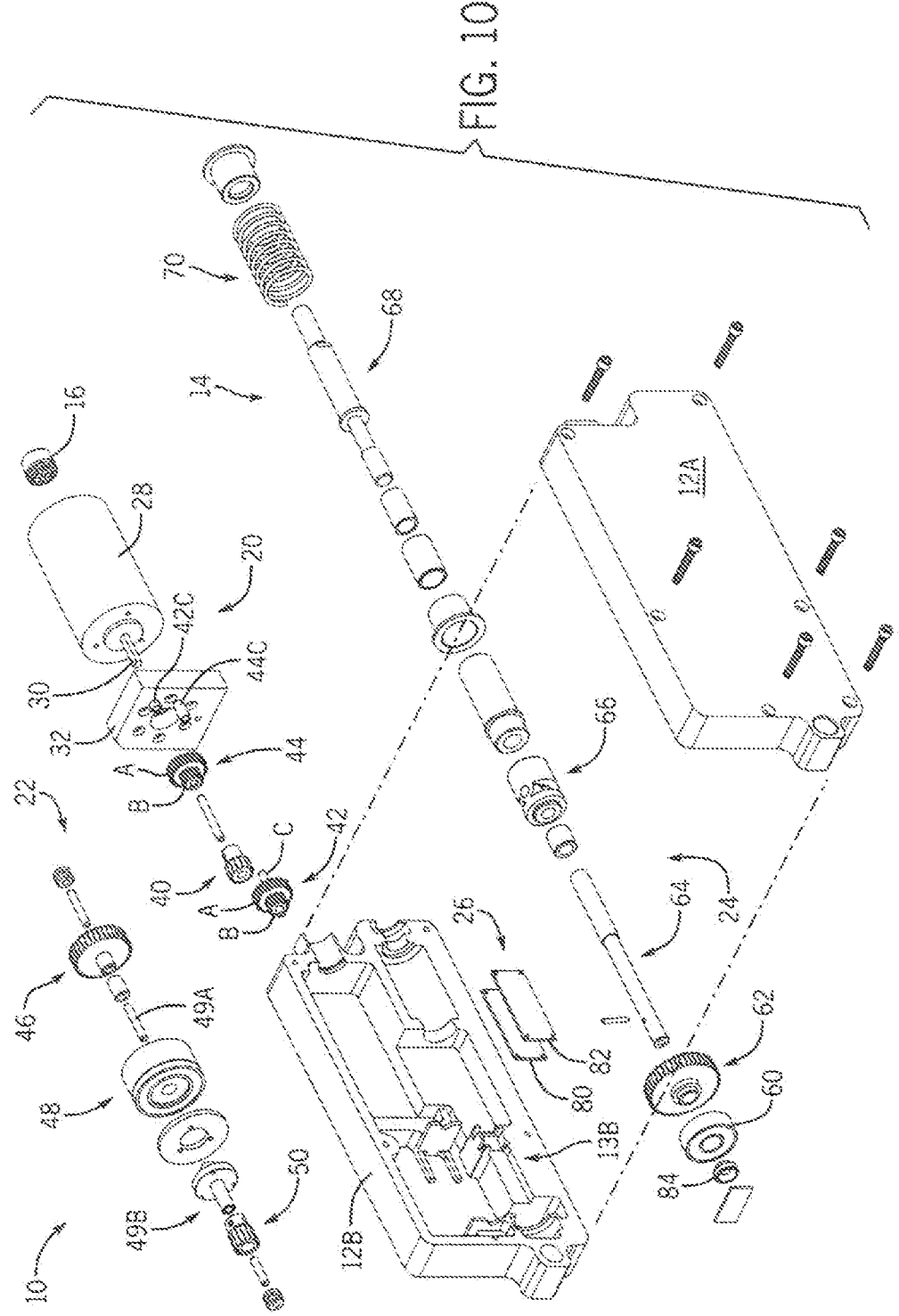
FIG. 10 is a fully exploded view of the actuator.
Figure 11:
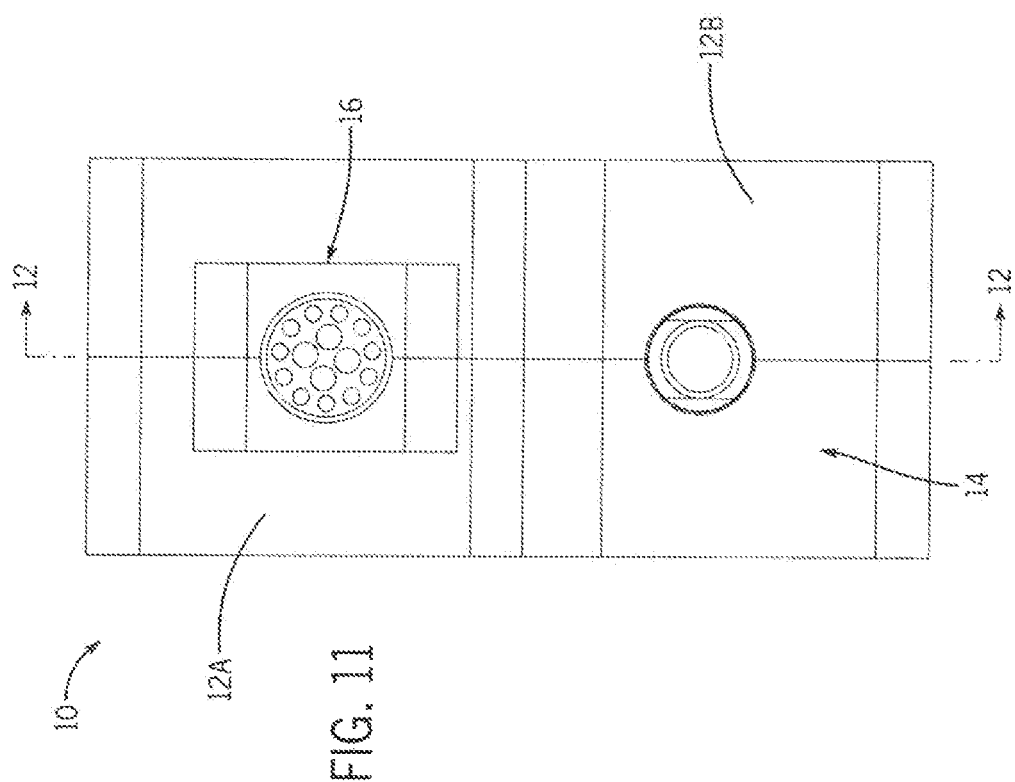
FIG. 11 is a further front or distal end view of the actuator.
Figure 12:
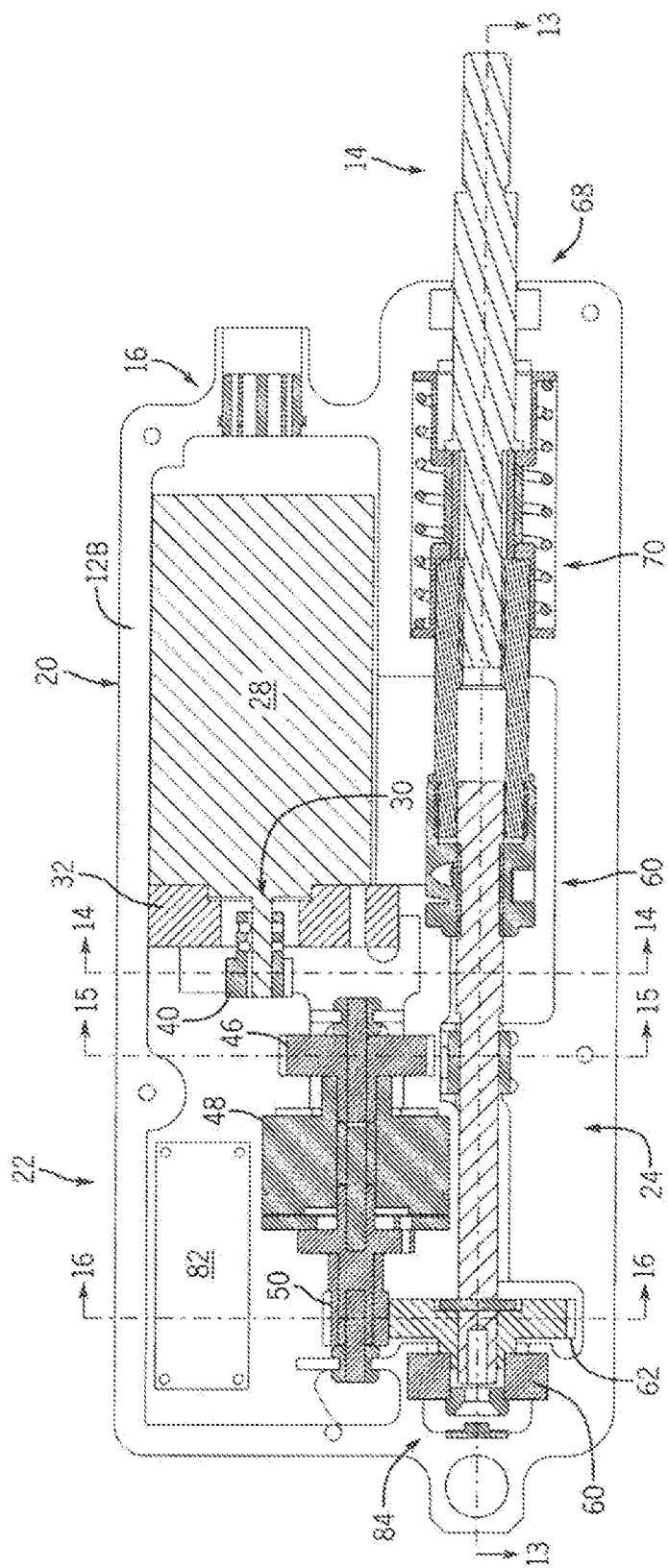
FIG. 12 is a longitudinal cross-sectional view of the actuator taken at line 12-12 of FIG. 11.
Figure 16:
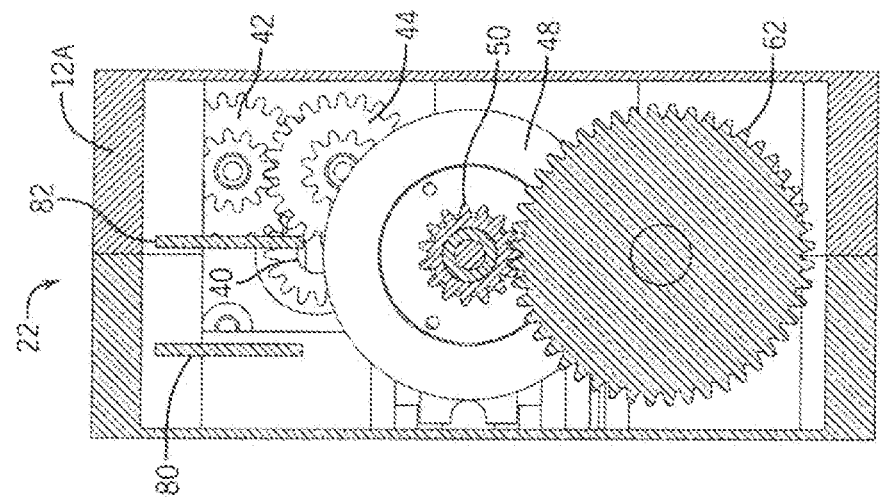
FIG. 16 is a transverse cross-sectional view of the actuator taken at line 16-16 of FIG. 12.
Figure 15:
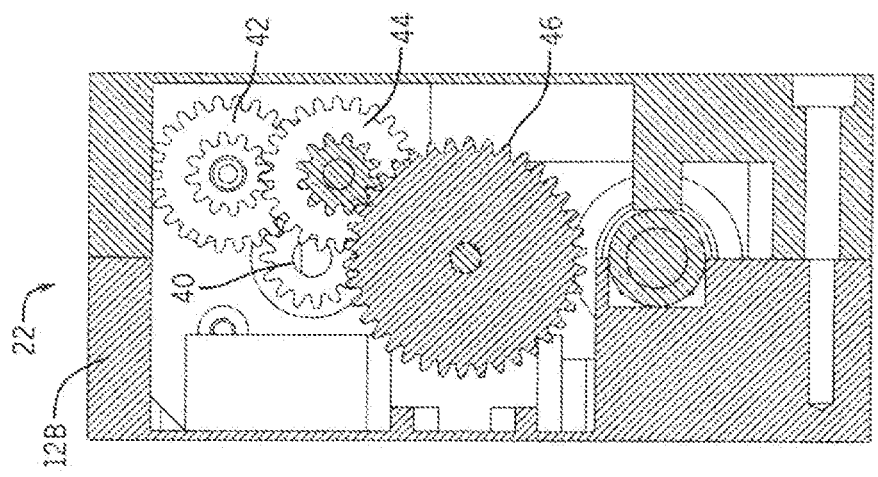
FIG. 15 is a transverse cross-sectional view of the actuator taken at line 15-15 of FIG. 12.
Figure 14:
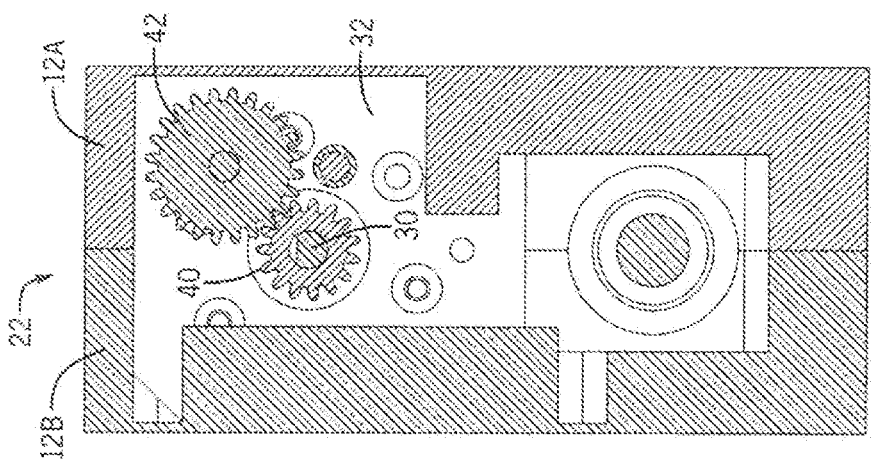
FIG. 14 is a transverse cross-sectional view of the actuator taken at line 14-14 of FIG. 12.

Turning to FIGS. 6 and 7, the actuator 10 housing 12 preferably consists of two halves 12A and B. Internally, the actuator 10 primarily comprises a motor assembly 20, a transmission assembly 22, a linear drive assembly 24, and an electronic control assembly 26. The power port 16 is electrically communicatively connected to the motor assembly 20. The electronic control assembly 26 is also electrically communicatively connected to the motor assembly 20. The motor assembly 20 is mechanically communicatively connected to the transmission 22, which in turn is mechanically coupled to the linear drive 24. The output of the linear drive assembly 24 is the linear output shaft or rod 14.

The housing 12 is molded to securely support all moving interior components when both halves are sealingly coupled together, preferably by fasteners such as bolts or screws. The electrical connector 16 is exposed to the exterior of the housing 12 and is electrically connected to the motor assembly 20. The motor assembly 20 transfers rotational motion to the transmission 22. The transmission 22 transfers rotational motion to the linear drive assembly 24. The linear drive assembly 24 converts rotational motion from the transmission 22 to linear motion which is output to the linear output shaft or pushrod 14. The pushrod 14 is in communication with the exterior of the housing 12. The electronic control assembly 26 is communicatively connected to the motor assembly 20 and to the linear drive assembly 24 and enables precise, consistent control of the actuator 10.

Referring also to FIGS. 8 to 16, the motor assembly 20 includes a motor 28, preferably a DC motor. It may be brush or brushless type. The motor 28 is fixedly supported with respect to the housing by a motor mount 32. Motor mount 32 is fixedly coupled to the housing 12. A motor shaft 30 extends outwardly from end of the motor 28 opposite that of the power connector 16. The motor assembly 20 is communicatively connected to the transmission assembly 22. The principle parts of the transmission assembly 22 include a plurality of gears and a clutch. Motor shaft 30 is coupled and rotates a first, motor gear 40. First gear 40 is connected to and transmits rotational motion to a second, idler, gear 42. Second gear 42 is preferably a compound gear, the larger diameter, major component A thereof meshes with the first gear 40. The smaller diameter, minor B of second gear 42 meshes with and transmits rotational motion to a third gear 44. The second gear 42 is mounted to and extends from motor mount 32 via shaft 42c. Third gear 44 is also preferably a compound gear having larger major A and smaller minor B components. The larger diameter component A of a third gear 44, meshes with the smaller gear B of second gear 42. The smaller component B of third gear 44 meshes with and transmits rotational motion to a fourth gear 46. The third gear 44 is also mounted to and extends from motor mount 32 via shaft 44c. Fourth gear 46 is attached to an input shaft 49A of a mechanism 48. Clutch mechanism 48 has an output shaft 49B on which is mounted a fifth gear 50. The aforementioned elements are disposed consecutively, away from motor 28. The clutch 48 manages engagement of the upstream motor assembly 20 with the linear drive assembly 24, which is oriented back towards the upstream end of the actuator, generally parallel to the motor assembly 20.

The fifth gear 50 of the clutch 48 meshes with and transmits rotational motion to a sixth, drive gear 62, which functions as an input to the linear drive assembly 24. A bearing assembly 60 is fixedly coupled to the housing 12 downstream, relative to the motor assembly 20, from the fifth gear 50. A proximal end of a first shaft assembly 64 of the drive assembly 24 is rotatably coupled to the bearing assembly 60. The distal end of the first shaft assembly 64 is connected to a drive nut 66. Drive nut 66 converts rotational motion of the first shaft assembly 64 to linear motion (extend, retract, stop, or go to an absolute position) of a second shaft assembly 68, connected to the opposite, distal, end of the drive nut 66, and thus functions as a rotary to linear converter. A spring centering mechanism 70 is disposed about the second shaft assembly 68 and within a cylindrical cavity of the housing 12 at a distal end of the drive assembly 24. The self centering spring design ensure that when no power is applied, the actuator 10 returns to a center neutral position. The distal end of the second shaft assembly 68 is connected to the pushrod 14, which protrudes through a rod seal 72 to the exterior of the housing 12 for connection to an external element (not shown). The two part shaft assembly 64/68 allows spinning without the risk of breaking the nut 66 and spring return 70.

The electronic control assembly 26 includes a motor controller 80 (preferably in the form of a card), a radio transmitter/receiver card 82, and a position sensor 84. The controller 80 and transmitter 82 are preferably constructed on printed circuit boards (PCBs) in the form of compact cards. They are disposed opposite the proximal end of the drive assembly 24. The motor controller 80 is electrically communicatively connected to the motor 28, and a position sensor 84. The controller 80 has hardware means to start and stop the motor 28 based on information received about the rotational position of the first shaft assembly 64 from the position sensor 84. The position sensor 84 is preferably a magnetic, non-contact type sensor and is disposed at the very end of the proximal end of the first shaft assembly 64. The position sensor may alternatively be connected through gearing. For example, if the shaft 64 rotates 10 times gears may limit rotation less than one revolution allowing true position calculation. The transmitter/receiver 82 is electrically communicatively connected to the motor controller 80 and provides a means of operating actuator 10 via a remote control device, for example a handset. The transmitter/receiver 82 is preferably a radio frequency (RF) type device.

Figure 17:
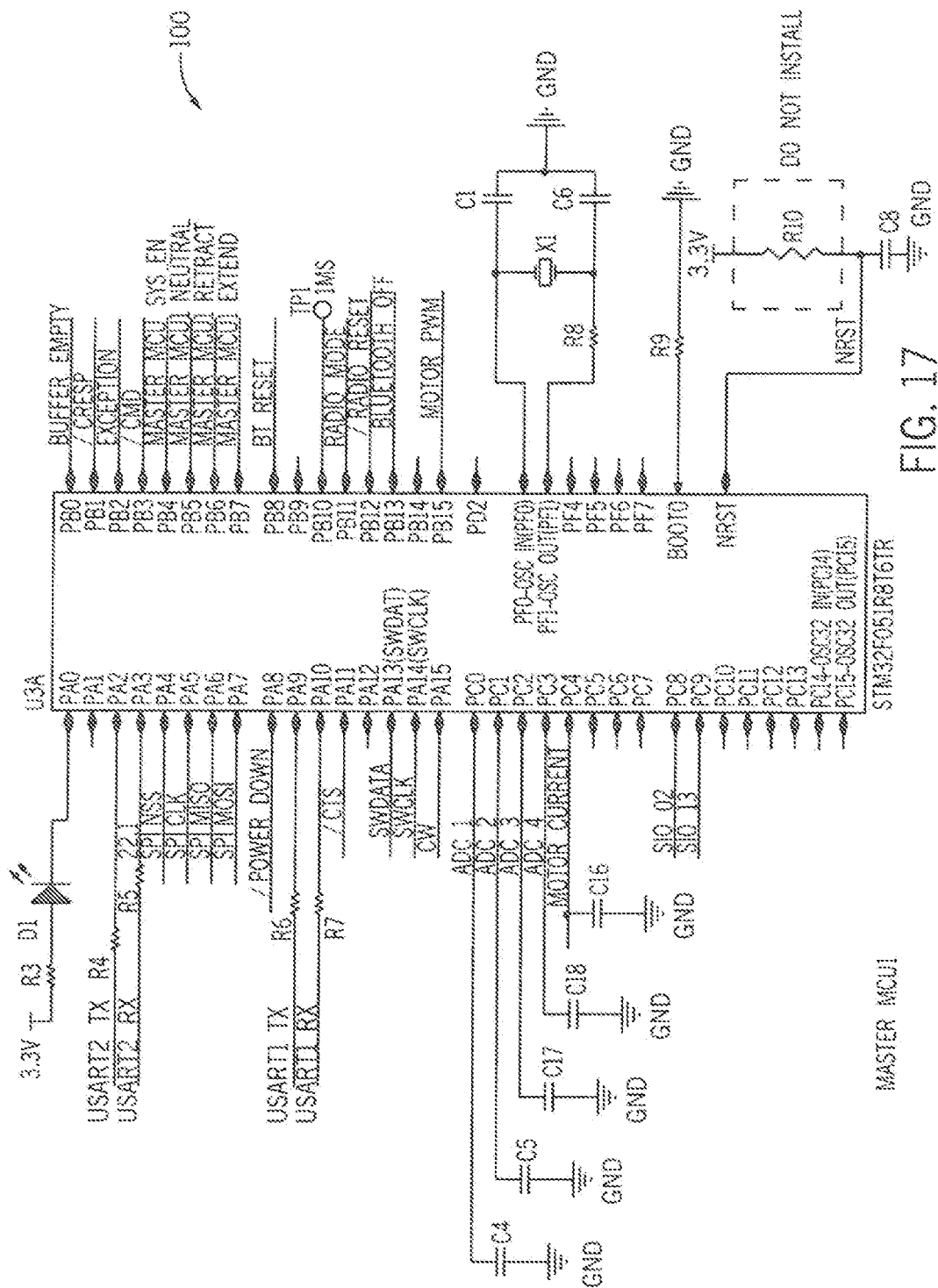
FIG. 17 is a schematic circuit diagram of a first block of an embodiment of a master microcontroller section of a Radio Receiver Board (PCB) of the system.
Figure 18:
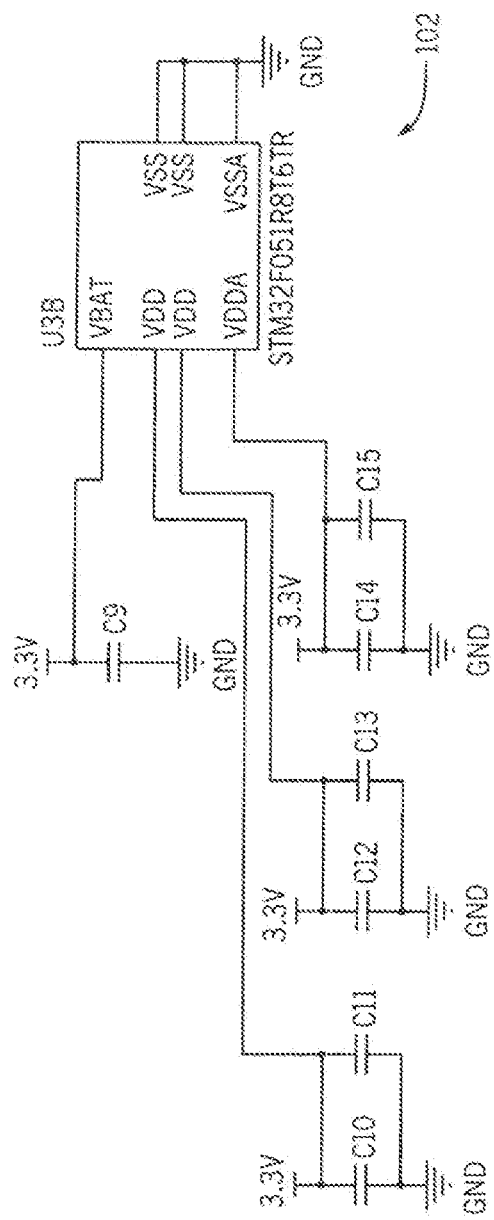
FIG. 18 is a schematic circuit diagram of a second block of the master microcontroller section.
Figure 19:
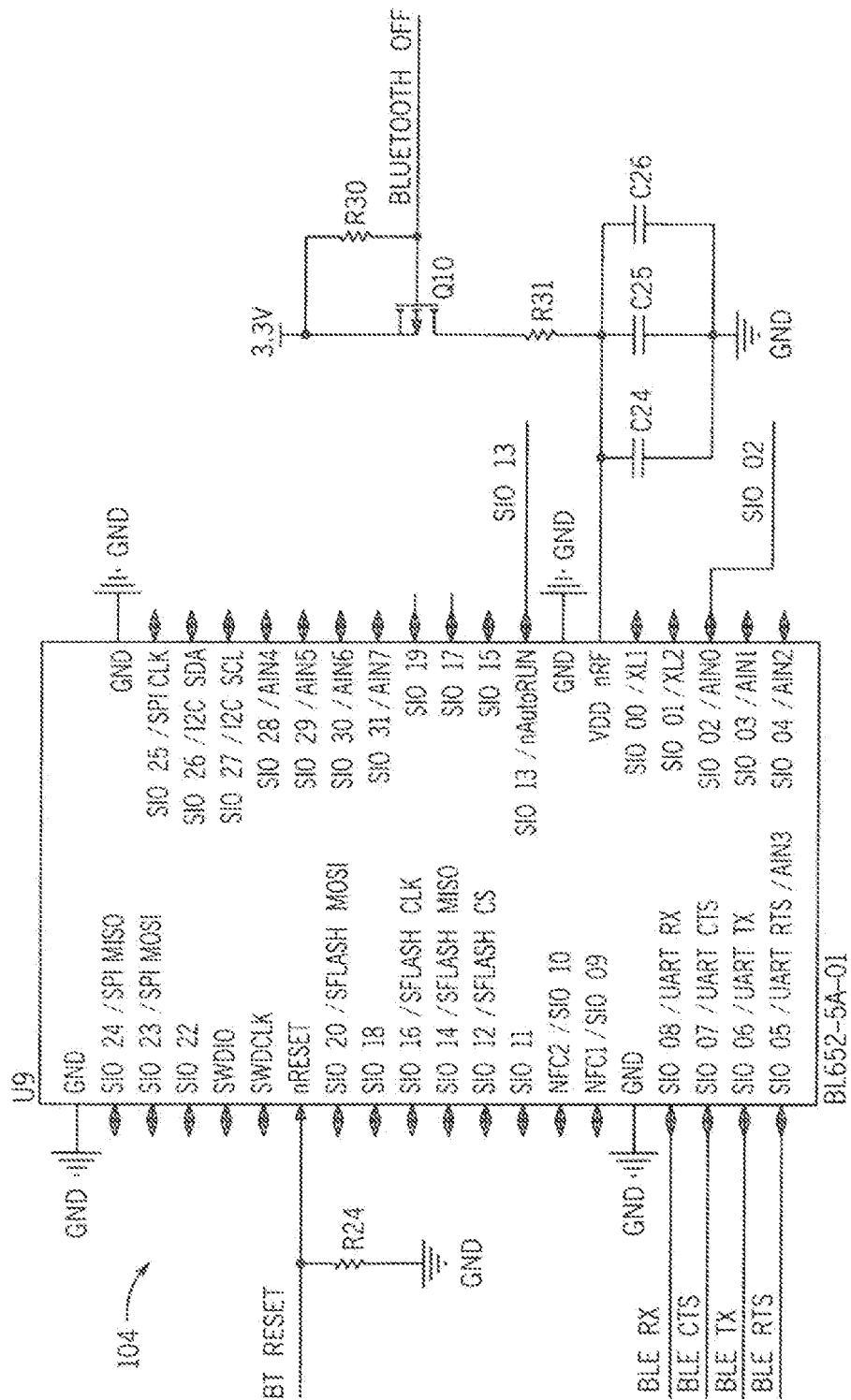
FIG. 19 is a schematic circuit diagram of a short range Ghz section of the Radio Receiver Board.
Figure 20:
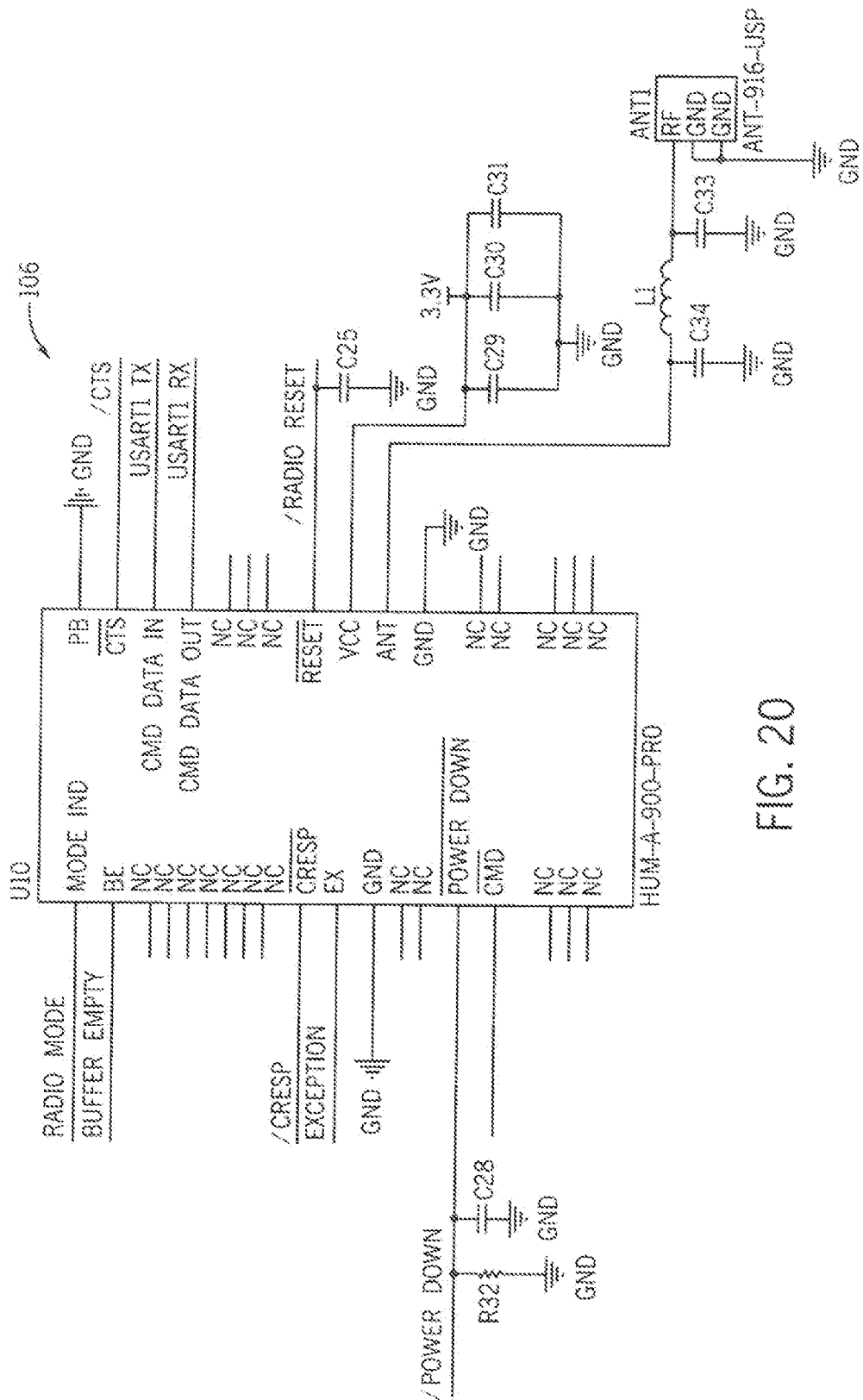
FIG. 20 is a schematic circuit diagram of a long range Sub Ghz section of the Radio Receiver Board.
Figure 21:
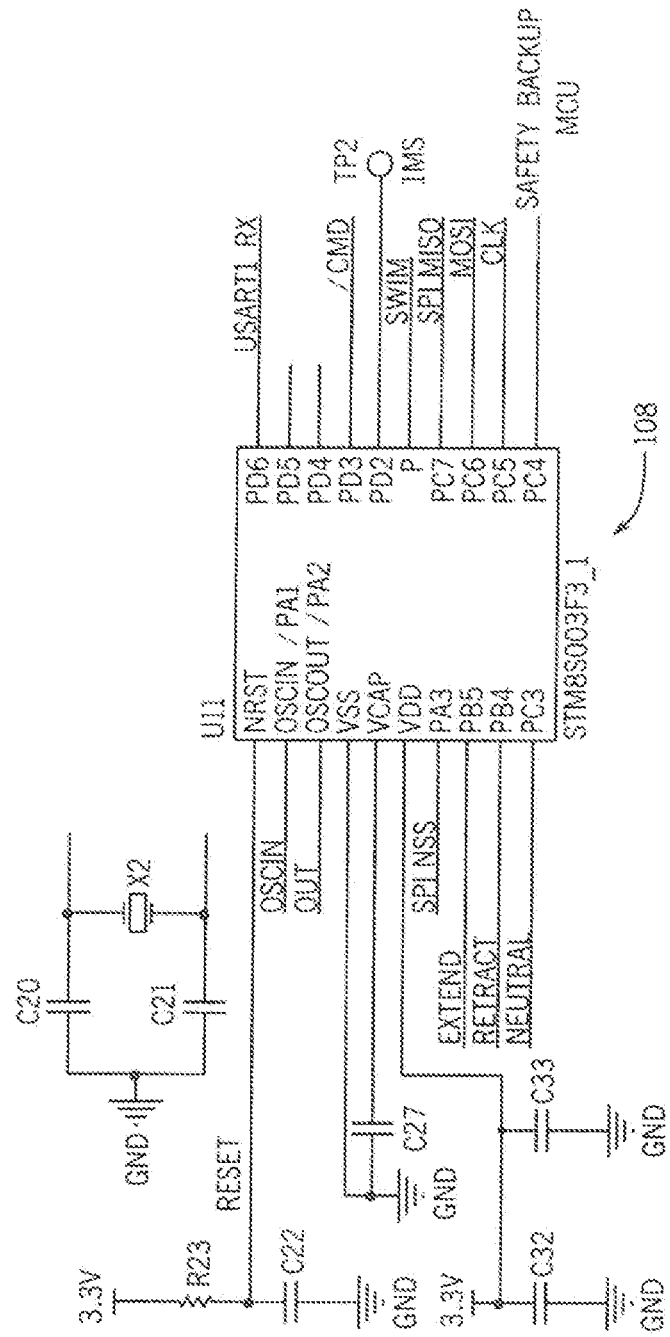
FIG. 21 is schematic circuit diagram of a safety backup microcontroller section of the Radio Receiver Board.
Figure 22:
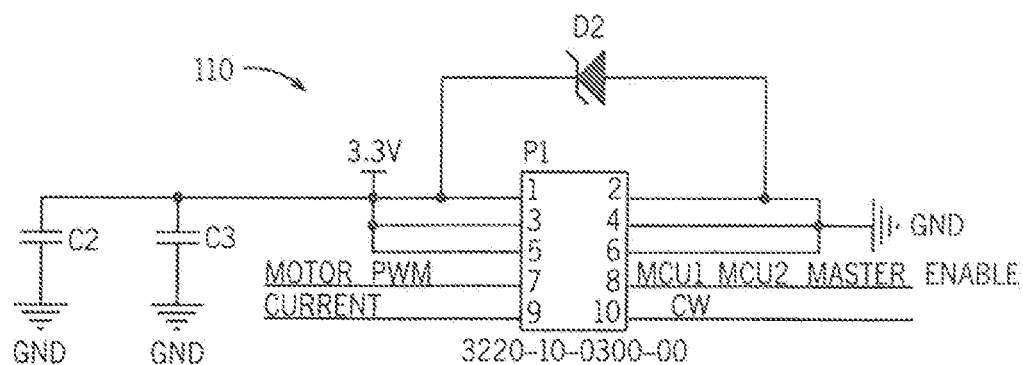
FIG. 22 is a schematic circuit diagram of a power connector of the Radio Receiver Board.
Figure 23:
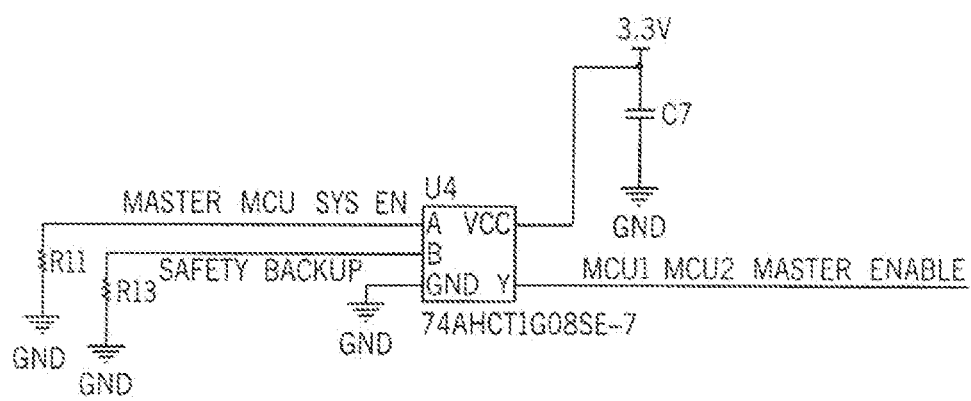
FIG. 23 is a schematic circuit diagram of a dual processor safety enable of the Radio Receiver Board.

FIGS. 17-23 are schematic circuit diagrams of various modules, sections or blocks of an embodiment of the Radio Receiver Board 82 of the system. FIGS. 17 and 18 are first and second modules 100 and 102 of a master or primary microcontroller of the system. FIG. 19 is a schematic circuit diagram of a Ghz R F transmitter/receiver section 104 which is used during short range paring of the actuator 10 to a hand held controller. FIG. 20 is a schematic circuit diagram of a Sub Ghz RF transmitter/receiver section 106 which functions for communication of normal, longer range operational commands between the hand held controller and the actuator 10. FIG. 21 is schematic circuit diagram of a secondary or safety processor section 108. Its purpose and operation are described further below. FIG. 22 is a schematic circuit diagram of a power connector 110 of the board 82. FIG. 23 is a schematic circuit diagram of an embodiment of a processor 1 and processor 2 Enable signal, the Master Enable is on if both processors are in agreement of a Sub GHz control command. The circuit includes an AND Gate. If the Master MCU is requesting motion and the safety backup agrees with the motion request this AND gate is enabled and the Master Enable signal is high.

Figure 24:
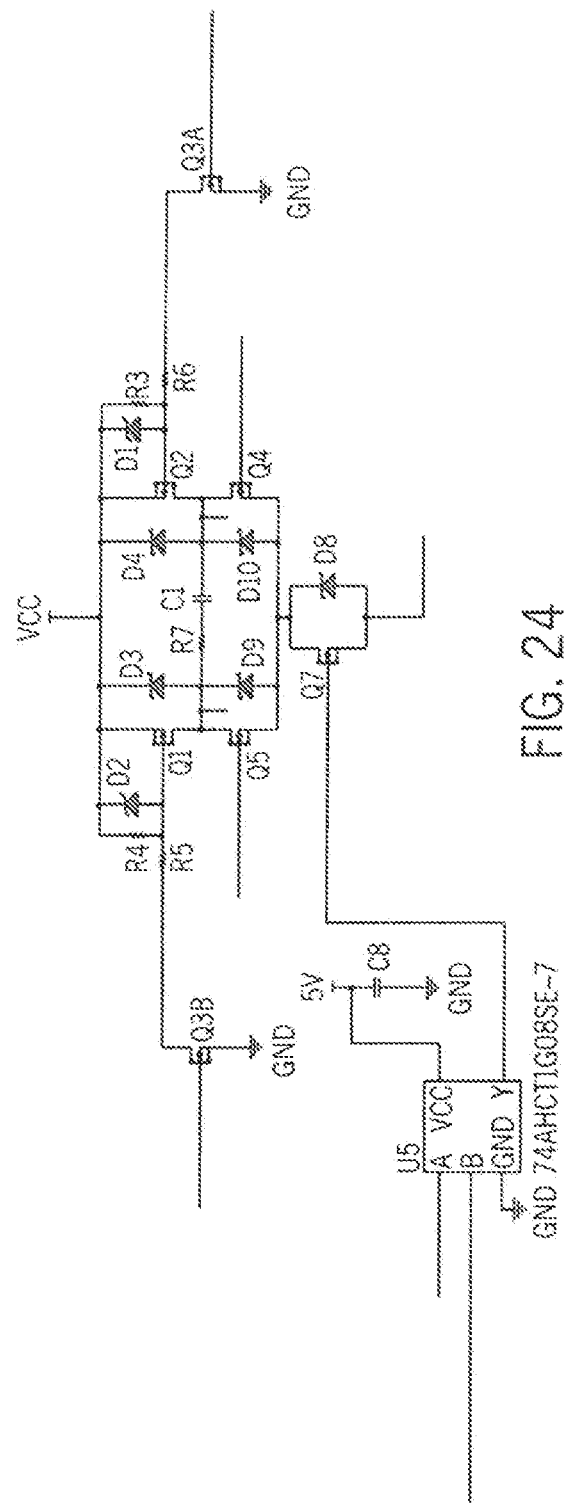
FIG. 24 is a schematic circuit diagram of a first block or section of a Motor Controller Board (PCB) of the system, which outlines the usage of the safety enable.
Figure 25:
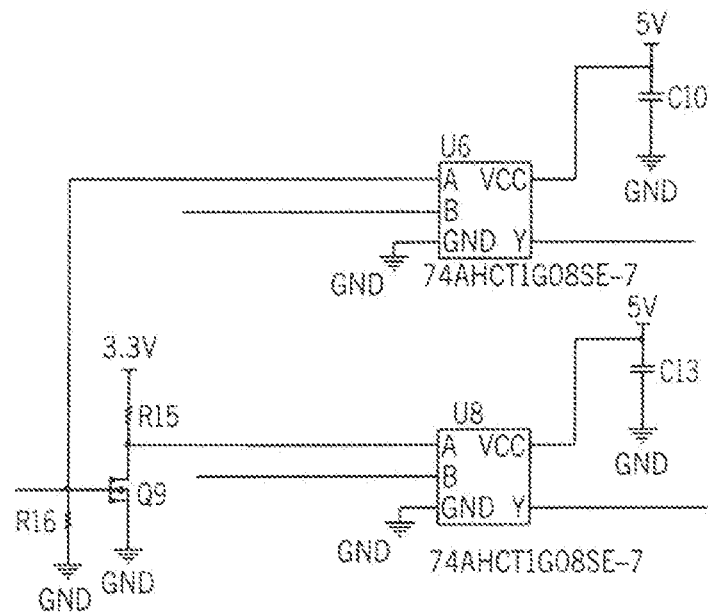
FIG. 25 is a schematic circuit diagram of a second block or section of the Motor Controller Board, which functions as direction control using the safety enable.
Figure 26:
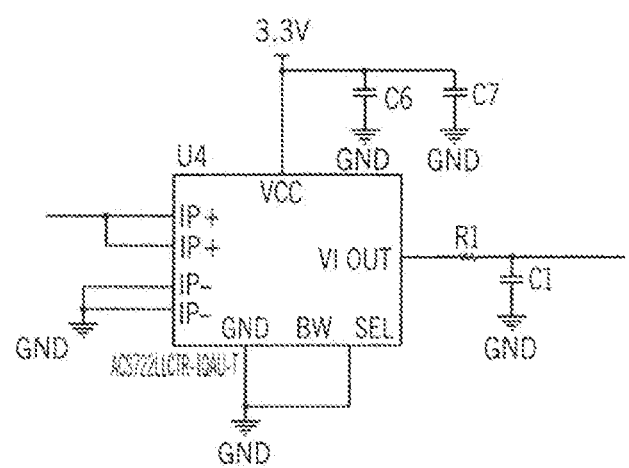
FIG. 26 is a schematic circuit diagram of a third block or section of the Motor Controller Board, which monitors motor current.
Figure 27:
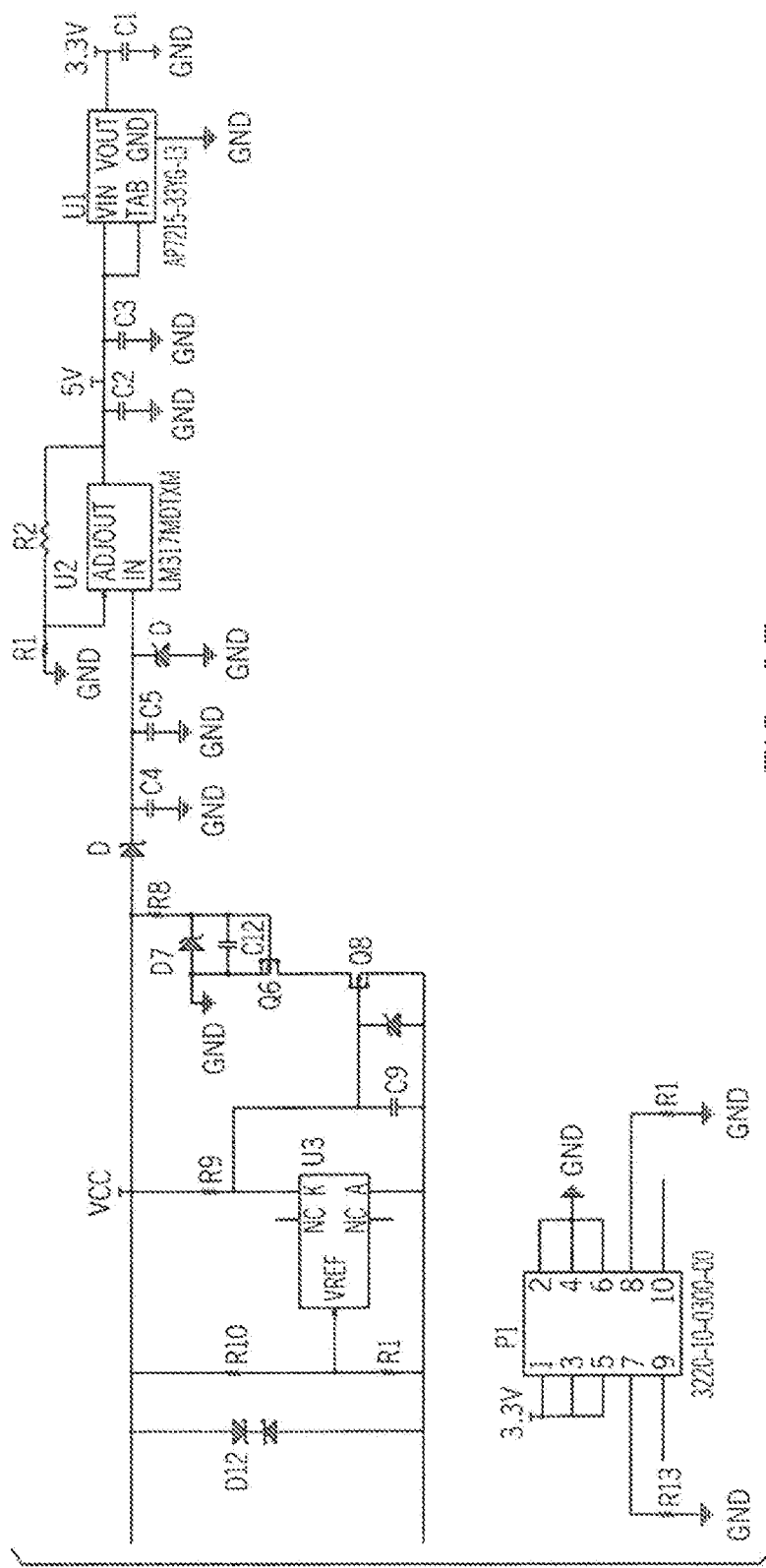
FIG. 27 is a schematic circuit diagram of a fourth block or section of the Motor Controller Board, which performs Reverse Polarity Protection, Load Dump Protection (Over Voltage), and Power Connection functions.

FIGS. 24-27 are schematic circuit diagrams of the blocks or sections of a Motor Controller Board 80 of the system. FIG. 24 is a section which functions as a standard bi direction H bridge for 2 Direction motor control showing the safety enable. The circuit provides motion control where the motor Pulse Width Modulation (PWM) command can only be activated if Enable is active. FIG. 25 is a schematic circuit diagram of a second block or section of the Motor Controller Board, which functions as part of the motor direction control utilizing the safety enable circuit. Enable is required to select motor direction control. FIG. 26 is a schematic circuit diagram of a third block or section, which functions as a motor current sensor. FIG. 27 is a schematic circuit diagram of a fourth block or section, which performs Reverse Polarity Protection, Load Dump Protection (Over Voltage), and Power Connection.

This actuator circuitry 80 and 82 permits uniquely networking one hand held controller to multiple actuators 10. The circuitry has both a Ghz transmitter 104 for pairing distances and a Sub Ghz transmitter 106 for working distances, each of which has a unique address. The hand held external controller or control device (not shown) has complementary Ghz and Sub Ghz transmitters with unique addresses. The hand held controller is constructed with a button sequence for requesting that the controller pair with the actuator as follows. The controller sends a Ghz device pair request. This is a low power communication local to the pairing request. The actuator 10 then pairs with the controller. The actuator 10 is programmed to only receive commands from the address of the hand held controller. The controller is programmed for the subject channel to only communicate with this address for the actuator 10 for the assigned buttons in this pairing. True point to point unique communication is achieved. Addressing is saved in non-volatile memory on both the controller and the actuator 10. Importantly, the hand held controller is uniquely pair-able with multiple actuators 10. Each hand held controller button set is assigned a unique point to point address using the above pairing sequence. After pairing, longer range sub Ghz RF communication then uses the point to point address mode to communicate control commands from the hand held controller buttons to the actuator 10.

The actuator circuitry 80/82 includes a dual processor safety mode to ensure that no single point processor motor control failure will activate actuator movement. A first or primary processor 100/102 is interfaced to RF device 106 to receive long range commands. The primary processor 100/102 controls motor 20 direction and speed. A second or secondary processor 108 listens to the same RF device 106 and validates commands. The primary processor 100/102 communicates to the secondary processor 108 the motor commands being executed. The primary processor 100/102 and secondary processor 108 both receive long range, sub-Ghz. RF commands. The secondary processor 108 enables motor 20 operation if the primary commands match secondary commands received from the RF device 106.

The primary processor 100/102 has an output which terminates power consumption after a predetermined period of time where no long range RF command is received. The actuator 80/82 returns to a self centered (spring centered) neutral position if the control commands cease for the predetermined time period.

The Ghz RF module 104 has a high data rate transfer to permit fast, reliable software application update. The processor 100/102 has a bootloader interfaced to the Ghz RF module. A communication protocol allows the Ghz RF module 104 to transmit the actuator operational application (position control: extend, retract, or stop or go to an absolute position) to the processor 100/102. The bootloader mode allows the data from the Ghz RF 104 module to be programmed to the application address range in the processor 100/102. The bootloader allows pass through of application update from the Ghz RF module 104 to the primary processor 100/102 to the secondary processor 108 for update of the secondary processor 108 application.

The hand held controller (not shown) preferably has a processor with the ability to disengage power completely. This stops all power to the controller to strictly limit power consumption and to ensure that no unintended RF commands are transmitted to the actuator 10. The controller has a stop button for disabling the power. The processor includes an output pin which acts as the power down button to removing all power after a predetermined time. A reset button allows power to be re-enabled to the hand held controller. The hand-held controller preferably has a rechargeable battery. The hand-held controller preferably has 6 sets of buttons allowing extend and retract commands to 6 unique actuators. The hand-held controller preferably has LED indicators which inform the operator of battery status and actuator pairing information.

The overall actuator device 10 is preferably substantially rectangular with rounded corners. It is preferably substantially constructed of a rigid metal and/or plastic materials. Although these geometries and dimensions are preferred, it is within the purview of the invention that an actuator 10 can be constructed having other geometries and dimensions.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A remotely controllable actuator, comprising:
an electric motor for creating rotary motion;
a transmission connected to the motor, the transmission comprising a motor gear connected to an output of the electric motor, at least two idler gears communicatively connected to the motor gear, a clutch communicatively connected to at least one idler gear and a drive gear communicatively connected to the clutch, the clutch having an input shaft with an input gear communicatively connected to at least one idle gear, and an output shaft with an output gear communicatively connected to the drive gear;
a linear drive assembly connected to the transmission, the linear drive assembly comprising a rotary to linear converter communicatively connected to the drive gear, and a linear output shaft connected to the rotary to linear converter, the linear output shaft being configured to be connected to an external element; and
a remote control communication circuit communicatively connected to the motor, the remote control communication circuit comprising a GHz transmitter/receiver configured for paring the actuator to a remote control device and a Sub GHz transmitter/receiver configured for communicating operational control signals between the remote control device and the actuator.

2. The actuator of claim 1, wherein at least one idler gear is a compound gear including a major gear of a first diameter and a minor gear of a second, lesser diameter.

3. The actuator of claim 1, wherein the linear drive assembly further comprises a rotatable first shaft assembly connected between the drive gear and the rotary to linear converter and a linearly movable second shaft assembly connected between the rotary to linear converter and the linear output shaft.

4. The actuator of claim 1, further comprising a spring centering mechanism, the spring centering mechanism placing the linear output shaft to a center neutral position in the absence of power being applied to the actuator.

5. The actuator of claim 1, wherein the rotary to linear converter comprises a drive nut assembly.

6. The actuator of claim 1, further comprising an electronic position sensor communicatively connected to the motor and to the rotary to linear converter, whereby the motor rotates the gears of the transmission, which causes the rotary to linear converter to linearly move the linear output shaft, and whereby the position sensor provides electronic signals to the motor to enable control of the linear position of linear output shaft.

7. The actuator of claim 6, wherein the electronic position sensor is a non-contact, magnetic, sensor.

8. The actuator of claim 1, further comprising a housing enclosing the electric motor, transmission, linear drive assembly, and remote control communication circuit.

9. The actuator of claim 1, further comprising a first processor communicatively connected to the remote control communication circuit, the first processor: (a) being configured to receive motor control commands from the remote control device; and (b) controls the speed and direction of the motor based on the motor control commands.

10. The actuator of claim 9, further comprising a second processor which is communicatively connected to the first processor and to the remote control communication circuit, the second processor (a) receives motor control commands from the first processor, (b) receives motor control commands from the remote control communication circuit, and (c) enables control of the speed and direction of the motor, if the motor control commands received from the first processor match the motor control commands received from the remote control communication circuit.

11. The actuator of claim 9, wherein the first processor has an output which terminates power consumption after a predetermined time period wherein no motor control commands are received.

12. An electronic, remote controllable, linear actuator, comprising:
   a. a DC electric motor for creating rotary motion;
   b. a transmission connected to the motor,
   c. a linear drive assembly connected to the transmission, the linear drive assembly comprising a rotary to linear converter communicatively connected to the transmission, a linear output shaft connected to the rotary to linear converter, the linear output shaft being configured to be connected to an external element;
   d. an electronic position sensor communicatively connected to the motor and to the rotary to the linear drive assembly, whereby the motor rotates the plurality of gears, which causes the rotary to linear converter to linearly move the output shaft, and whereby the position sensor provides electronic signals to the motor to enable control of the linear position of the output shaft;
   e. a remote control communication circuit comprising a GHz transmitter configured for paring the actuator to a remote control device and a Sub GHz transmitter configured for communicating operational control signals between the remote control device and the actuator;
   f. a first processor communicatively connected to the remote control communication circuit, the primary processor: (a) being configured to receive motor control commands from the remote control device; and (b) controls the speed and direction of the motor based on the motor control commands; and
   g. a second processor which is communicatively connected to the first processor and to the remote control communication circuit, the second processor (a) receives motor control commands from the first processor, (b) receives motor control commands from the remote control communication circuit, and (c) enables control of the speed and direction of the motor, if the motor control commands received from the first processor match the motor control commands received from the remote control communication circuit.

13. An electronic, remotely controllable linear actuator, which is adapted to be used with other linear actuators controllable from a single remote controller, comprising:
   a. a DC electric motor for creating rotary motion;
   b. a transmission connected to the motor, the transmission comprising
      i. a motor gear connected to an output of the electric motor,
      ii. at least two idler gears communicatively connected to the motor gear, each idler gear being compound gears including a major gear of a first diameter and a minor gear of a second, lesser diameter, and
      iii. a drive gear communicatively connected to at least one idler gear and to the linear drive assembly, and
      iv. a clutch disposed between at least one idler gear and the drive gear;
   e. a linear drive assembly connected to the transmission, the linear drive assembly comprising
      i. a drive nut assembly rotary to linear converter communicatively connected to at least one transmission gear,
      ii. a linear output shall connected to the rotary to linear converter, the linear output shaft being configured to be connected to an external element,
      iii. a rotatable first shaft assembly connected between the drive gear and the rotary to linear converter,
      iv. a linearly movable second shaft assembly connected between the rotary to linear converter and the output shaft; and
      v. a spring centering mechanism, the spring centering mechanism placing the output shaft to a center neutral position in the absence of power being applied to the linear actuator;
   d. an electronic position sensor communicatively connected to the motor and to the rotary to the linear drive assembly, whereby the motor rotates the plurality of gears, which causes the rotary to linear converter to linearly move the output shaft, and whereby the position sensor provides electronic signals to the motor to enable control of the linear position of the output shaft;
   e. a remote control communication circuit comprising a GHz transmitter configured for paring the actuator to the remote controller and a Sub GHz transmitter configured for communicating operational control signals between the remote controller and the actuator;
   f. a first processor communicatively connected to the remote control communication circuit, the primary processor: (a) being configured to receive motor control commands from the remote controller; and (b) controls the speed and direction of the motor based on the motor control commands, wherein the first processor has an output which terminates power consumption after a predetermined time period where no long range RF command is received allowing the actuator to return to the center neutral position; and
   g. a second processor which is communicatively connected to the primary processor and to the remote control communication circuit, the second processor (a) receives motor control commands from the first processor, (b) receives motor control commands from the remote control communication circuit, and (c) enables control of the speed and direction of the motor, if the motor control commands received from the first processor match the motor control commands received from the remote control communication circuit.

14. A remotely controllable actuator, comprising:
an electric motor for creating rotary motion;
a transmission connected to the motor, the transmission comprising a motor gear connected to an output of the electric motor, at least one idler gear communicatively connected to the motor gear, and a drive gear communicatively connected to the at least one idler gear and to the linear drive assembly,
a linear drive assembly connected to the transmission, the linear drive assembly comprising a rotary to linear converter communicatively connected to at least one transmission gear, and a linear output shaft connected to the rotary to linear converter, the linear output shaft being configured to be connected to an external element, the linear drive assembly further comprising a rotatable first shaft assembly connected between the drive gear and the rotary to linear converter and a linearly movable second shaft assembly connected between the rotary to linear converter and the output shaft; and
a remote control communication circuit communicatively connected to the motor, the remote control communication circuit comprising a GHz transmitter/receiver configured for paring the actuator to a remote control dev ice and a Sub GHz transmitter/receiver configured for communicating operational control signals between the remote control device and the actuator.

15. A remotely controllable actuator, comprising:
an electric motor for creating rotary motion;
a transmission connected to the motor, the transmission comprising a plurality of gears,
a linear drive assembly connected to the transmission, the linear drive assembly comprising a rotary to linear converter communicatively connected to at least one transmission gear, and a linear output shaft connected to the rotary to linear converter, the linear output shaft being configured to be connected to an environmental element;
a remote control communication circuit communicatively connected to the motor, the remote control communication circuit comprising a GHz transmitter/receiver configured for paring the actuator to a remote control device and a Sub GHz transmitter/receiver configured for communicating operational control signals between the remote control device and to the actuator;
wherein the GHz transmitter/receiver and the Sub GHz transmitter/receiver are each configured to have an address which is configured to complement an address of the remote control device;
further comprising a first processor communicatively connected to the remote control communication circuit, the first processor: (a) being configured to receive motor control commands from the remote control device; and (b) controls the speed and direction of the motor based on the motor control commands; and
further comprising a second processor which is communicatively connected to the first processor and to the remote control communication circuit, the second processor (a) receives motor control commands from the first processor, (b) receives motor control commands from the remote control communication circuit, and (c) enables control of the speed and direction of the motor, if the motor control commands received from the first processor match the motor control commands received from the remote control communication circuit.

* * * * *